United States Patent [19]
Krisco

[11] 3,753,194
[45] Aug. 14, 1973

[54] TEMPERATURE DIFFERENTIAL MONITOR
[75] Inventor: Carl Krisco, Oak Park, Ill.
[73] Assignee: V. A. C. Industries
[22] Filed: July 26, 1972
[21] Appl. No.: 275,275

[52] U.S. Cl. .............................. 337/331, 337/120
[51] Int. Cl. ......................................... H01h 29/30
[58] Field of Search .................. 337/331, 119, 120

[56] References Cited
UNITED STATES PATENTS
1,621,628  3/1927  Comerford .................. 337/331 X
2,158,146  5/1939  Parks et al. ...................... 337/119
2,596,825  5/1952  Smith et al. ...................... 337/329

Primary Examiner—Bernard A. Gilheany
Assistant Examiner—D. A. Tone
Attorney—Lloyd L. Zickert

[57] ABSTRACT

A thermal switch including first and second electroconductive column type thermostats at different preset temperature settings and a current limiting resistor, all interconnected together, wherein an output voltage is available between the two preset temperature settings of the thermostats.

4 Claims, 2 Drawing Figures

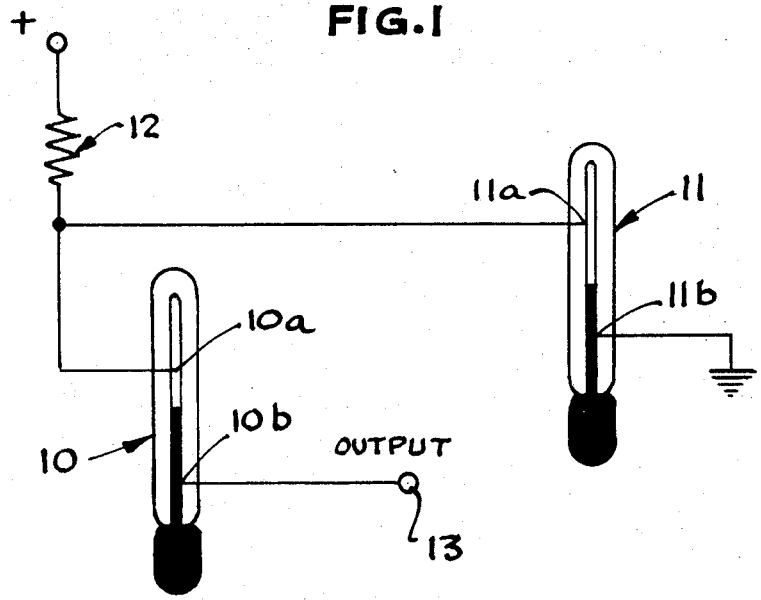
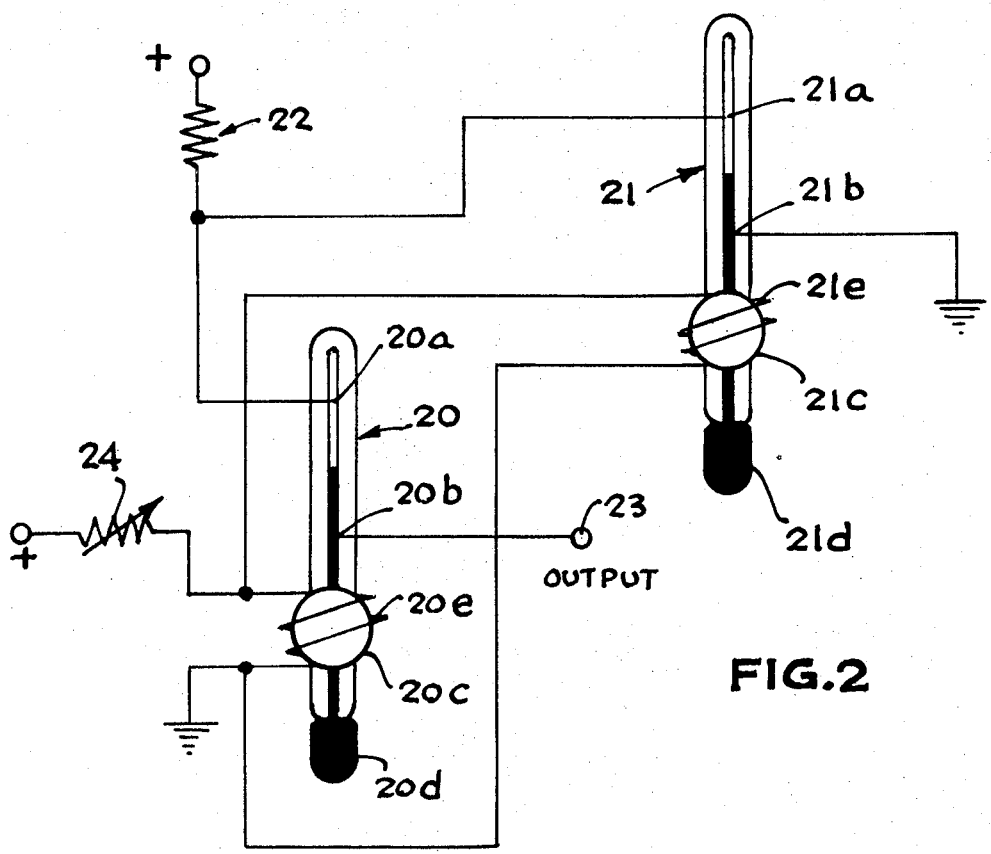

TEMPERATURE DIFFERENTIAL MONITOR

This invention relates in general to a thermal switch for monitoring a temperature differential in a duct or environment and more particularly to a thermal switch including two electro-conductive column type thermostats and a current limiting resistor connected together to provide an output voltage when sensing a temperature between the preset temperature settings of the thermostats.

The present invention is a sensor assembly or thermal switch operable to control a load in response to the temperature level monitor in a duct or environment where it is necessary to have extremely accurate temperature response. The present thermal switch eliminates electro-mechanical or solid state switching elements by merely including two electro-conductive column type thermostats, such as a mercury column type thermostat connected together with a current limiting resistor, so that the switch is on when the temperature is sensed between the preset temperature settings of the thermostats. The temperature settings of either thermostat may be set for any band, and it should be appreciated that adjustable thermostats may be used in lieu of the preset thermostats where a need for adjustability is desired.

Exemplary of the situation which the present invention would satisfy for monitoring a temperature range between 60° and 80°, where an output of a circuit is desired, would require the use of one thermostat having a preset temperature of 80° and another thermostat having a temperature of 60°. The upper contacts of the thermostats representing the 60° and 80° settings would be connected together and to a current limiting resistor which would in turn be connected to a positive potential. The lower contact of the 80° thermostat would be connected to negative potential, while the lower contact of the 60° thermostat would be connected to the output. Accordingly, as long as the temperature is between 60° and 80°, the switch will provide a voltage output. When the temperature is above 80° or below 60°, no voltage output will be provided by the switch.

It is therefore an object of the present invention to provide an extremely accurate and simple in construction thermal switch which does not require electro-mechanical or solid state switching elements.

A further object of this invention is in the provision of a sensor assembly for providing a variable voltage and current output within the power limitations of mercury column type thermostats at variable preset temperature settings.

A still further object of this invention is in the provision of a thermal switch including first and second electro-conductive column type thermostats connected together with a current limiting resistor wherein the switch delivers an output upon sensing a temperature range between the preset temperature settings of the thermostats.

Other objects, features and advantages of the invention will be apparent from the following detailed disclosure, taken in conjunction with the accompanying sheet of drawings, wherein like reference numerals like parts, in which:

FIG. 1 is a schematic drawing of one form of thermal switch according to the present invention; and FIG. 2 is a schematic drawing of another form of thermal switch according to the present invention.

Referring now to the drawings and particularly to FIG. 1, one form of thermal switch according to the present invention is illustrated which includes first and second electro-conductive column type thermostats 10 and 11 and a current limiting resistor 12. The thermostats 10 and 11 are preferably of the mercury-in-glass column type which are well known and which are of the type disclosed in U. S. Pat. No. 2,596,825, wherein each thermostat is provided with a preset temperature setting. The thermostats include respectively upper and lower electrical contacts 10a, 11a and 10b, 11b. The upper electrical contacts are connected together and to one end of the current limiting resistor 12. The other end of the current limiting resistor is connected to a positive potential. The lower contact 10b of the thermostat 10 is connected to the output, while the lower contact 11b of the thermostat 11 is connected to a negative potential. The upper contact 11a represents a preset temperature of a level higher than the preset temperature level of the upper contact 10a of the thermostat 10. For example, the upper contact 11a may be set for 80° F., while the upper contact 10a may be set for 60° F. In operation, the switch in FIG. 1 would then provide an output when the temperature sensed by the thermostats is between 60° and 80° F., for at this range the mercury column in thermostat 11 is below the upper contact 11a and the mercury column in thermostat 10 is above the upper contact in 10a. This provides a circuit through the thermostat 10 but does not provide a circuit through the thermostat 11. Further, no output voltage will be provided at the output terminal 13 when the temperature sensed reaches the 80° setting of thermostat 11, thereby electrically connecting the upper and lower contacts of thermostat 11 through the mercury column. The current limiting resistor 12 will then be connected to ground or negative potential and thereby essentially short out the thermostat 10 and place the voltage level at the output 13 at "0" volts. Inasmuch as the mercury column type thermostats are known for their accuracy, an extremely accurate thermal switch is defined by connecting the thermostats together in connection with a current limiting resistor as here provided. It should be appreciated that the preset temperature settings for the thermostats 10 and 11 may be at any band.

Another form of switch according to the invention is illustrated in FIG. 2 which differs only in that the thermostats are adjustable to permit adjustment of the temperature range for actuating the switch. The adjustable thermostats are of the well known mercury column type which includes upper and lower bulbs or mercury reservoirs, upper and lower spaced electrical contacts and a heating coil wound about the upper bulbs connected into a control circuitry for selectably energizing the heaters a predetermined amount to adjust the temperature setting.

First and second adjustable thermostats 20 and 21 are provided which respectively include upper contacts 20a, 21a, lower contacts 20b, 21b, upper bulbs 20c, 21c, and lower bulbs 20d, 21d. The upper contacts 20a and 21a are connected together and to one side of a current limiting resistor 22. The other side of the current limiting resistor is connected to a positive potential. The lower contact 21b of thermostat 21 is connected to ground or negative potential, while the lower contact 21b or the thermostat 21 is connected to an output terminal 23. Heating coils 20e and 21e for thermostats 20 and 21 are connected in parallel and to a potential through a variable resistor 24 which adjusts the current flow in the heating coils and thereby the heating of the upper bulbs of the thermostats. This thermal switch operates in the same manner as the embodiment of FIG. 1 in that the temperature setting of the thermostat 21 is higher than that of the thermostat 20 and an output voltage is delivered to the output terminal 23 when the temperature sensed is between the temperature settings of the thermostats 21 and 20. In the event it is desired to vary the temperature setting of the thermostats, the heating coils are suitably activated by control of the variable resistor 24.

From the foregoing, it should be appreciated that the switch of the present invention is capable of providing extremely accurate temperature differential monitoring of a duct or environment.

It will be understood that modifications and variations may be effected without departing from the scope of the novel concepts of the present invention, but it is understood that this application is to be limited only by the scope of the appended claims.

The invention is hereby claimed as follows:

1. A thermal switch comprising first and second mercury column type thermostats with different preset temperatures, each having upper and lower contacts and a current limiting resistor, means connecting one side of the resistor to positive potential, means connecting the other side of the resistor to the upper contacts of both said thermostats, means connecting the lower contact of one thermostat to negative potential, and means connecting the lower contact of the other thermostat to a load wherein said contact represents the output of the switch, whereby the switch is on when the temperature sensed by said thermostats is between the temperatures represented by the upper contacts of said thermostats.

2. The combination of claim 1, wherein said switch includes means for adjusting the operating temperatures.

3. The combination of claim 1, wherein said thermostats are adjustable to adjust the operating temperatures.

4. A thermal switch comprising first and second electro-conductive column type thermostats each having upper and lower electrical contacts and a current limiting resistor, the upper contacts of each thermostat representing high and low preset temperatures, means connecting the upper contacts of each thermostat together and to one side of a potential through a current limiting resistor, means connecting the lower contact of the thermostat having the highest preset temperature to the other side of the potential and means connecting the lower contact of the other thermostat to an output terminal, whereby the output is on when the temperature sensed is between the preset temperatures of said upper contacts.

* * * * *